United States Patent
Baek et al.

(10) Patent No.: US 11,594,728 B2
(45) Date of Patent: Feb. 28, 2023

(54) POSITIVE ELECTRODE AND SECONDARY BATTERY INCLUDING SAME

(71) Applicant: LG Chem, Ltd., Seoul (KR)

(72) Inventors: Joo Yul Baek, Daejeon (KR); Jun Muk Lim, Daejeon (KR); Hyun Sik Chae, Daejeon (KR); Sang Hoon Choy, Daejeon (KR)

(73) Assignee: LG Energy Solution, Ltd.

( * ) Notice: Subject to any disclaimer, the term of this patent is extended or adjusted under 35 U.S.C. 154(b) by 218 days.

(21) Appl. No.: 16/769,132

(22) PCT Filed: Jan. 21, 2019

(86) PCT No.: PCT/KR2019/000854
§ 371 (c)(1),
(2) Date: Jun. 2, 2020

(87) PCT Pub. No.: WO2019/143214
PCT Pub. Date: Jul. 25, 2019

(65) Prior Publication Data
US 2021/0151753 A1    May 20, 2021

(30) Foreign Application Priority Data
Jan. 19, 2018 (KR) .................. 10-2018-0007352

(51) Int. Cl.
*H01M 4/00* (2006.01)
*H01M 4/525* (2010.01)
(Continued)

(52) U.S. Cl.
CPC ......... *H01M 4/525* (2013.01); *H01M 4/0404* (2013.01); *H01M 4/505* (2013.01); *H01M 4/623* (2013.01); *H01M 2004/028* (2013.01)

(58) Field of Classification Search
CPC ...... H01M 4/625; H01M 4/525; H01M 4/622; H01M 2004/028; H01M 4/505; H01M 2004/021
See application file for complete search history.

(56) References Cited

U.S. PATENT DOCUMENTS

2006/0024584 A1   2/2006 Kim et al.
2008/0050655 A1   2/2008 Chu et al.
(Continued)

FOREIGN PATENT DOCUMENTS

CN   102668179 A   9/2012
CN   104393310 A   3/2015
(Continued)

OTHER PUBLICATIONS

Extended European Search Report including Written Opinion for Application No. EP19741173.9, dated Dec. 1, 2020, pp. 1-9.
(Continued)

*Primary Examiner* — Cynthia H Kelly
*Assistant Examiner* — Monique M Wills
(74) *Attorney, Agent, or Firm* — Lerner, David, Littenberg, Krumholz & Mentlik, LLP (57) ABSTRACT

A positive electrode includes a positive electrode active material layer including a positive electrode active material, a conductive material, and a binder, wherein the positive electrode active material contains any one among Li(Ni$_{x1}$Mn$_{y1}$Co$_{z1}$)O$_2$ ($0.55<x1<0.69$, $0.15<y1<0.29$, $0.15<z1<0.29$, $x1+y1+z1=1$) and Li(Ni$_{x2}$Mn$_{y2}$Co$_{z2}$)O$_2$ ($0.75<x2<0.89$, $0.05<y2<0.19$, $0.05<z2<0.19$, $x2+y2+z2=1$) and the conductive material contains a carbon nanotube, and when the positive electrode active material is Li(Ni$_{x2}$Mn$_{y2}$Co$_{z2}$)O$_2$, the positive electrode active material layer satisfies Relation 1 and when the positive electrode (Continued)

active material is Li(Ni$_{x2}$Mn$_{y2}$Co$_{z2}$)O$_2$, the positive electrode active material layer satisfies Relation 2:

$$0.0020 \times a < b < 0.0050 \times a \quad \text{[Relation 1]}$$

$$0.0015 \times a < b < 0.0044 \times a \quad \text{[Relation 2]}$$

wherein a is a loading amount (mg/25 cm$^2$) of the positive electrode and b is a total content (wt %) of the remaining components excluding the positive active material in the positive electrode material.

11 Claims, 2 Drawing Sheets

(51) Int. Cl.
    *H01M 4/04*     (2006.01)
    *H01M 4/505*     (2010.01)
    *H01M 4/62*     (2006.01)
    *H01M 4/02*     (2006.01)

(56) References Cited

U.S. PATENT DOCUMENTS

| | | | |
|---|---|---|---|
| 2012/0097905 A1 | 4/2012 | Chang et al. | |
| 2013/0228725 A1 | 9/2013 | Chang et al. | |
| 2013/0323607 A1* | 12/2013 | Issaev | H01M 10/0569 |
| | | | 429/338 |
| 2014/0030595 A1 | 1/2014 | Kishimi et al. | |
| 2014/0356695 A1 | 12/2014 | Abe et al. | |
| 2016/0099471 A1 | 4/2016 | Oh et al. | |
| 2017/0317389 A1 | 11/2017 | Tamaki et al. | |
| 2018/0159131 A1 | 6/2018 | Seol et al. | |
| 2018/0198129 A1 | 7/2018 | Kim et al. | |
| 2018/0219212 A1 | 8/2018 | Seol et al. | |
| 2018/0248195 A1 | 8/2018 | Choi et al. | |
| 2019/0280284 A1 | 9/2019 | Azami | |
| 2020/0136146 A1* | 4/2020 | Hellring | H01G 11/30 |

FOREIGN PATENT DOCUMENTS

| | | |
|---|---|---|
| CN | 106848327 A | 6/2017 |
| JP | H10208728 A | 8/1998 |
| JP | 2008053216 A | 3/2008 |
| JP | 2013093171 A | 5/2013 |
| JP | 2014192136 A | 10/2014 |
| JP | 2016085941 A | 5/2016 |
| JP | 2018160418 A | 10/2018 |
| KR | 20140070161 A | 6/2014 |
| KR | 20160040095 A | 4/2016 |
| KR | 20160146580 A | 12/2016 |
| KR | 20170049459 A | 5/2017 |
| KR | 20170063402 A | 6/2017 |
| KR | 20170069153 A | 6/2017 |
| KR | 20170111517 A | 10/2017 |
| WO | 2017074124 A1 | 5/2017 |
| WO | 2018051667 A1 | 3/2018 |

OTHER PUBLICATIONS

International Search Report for Application No. PCT/KR2019/000854 dated Apr. 18, 2019, 2 pages.
Peng Wanwan et al., "Effects of surface density and compaction density on properties of fast charge lithium ion battery", Nonferrous Metals Science and Engineering, Jun. 2017, vol. 8, No. 3, pp. 69-73 (English Abstract Attached).

* cited by examiner

POSITIVE ELECTRODE AND SECONDARY BATTERY INCLUDING SAME

CROSS-REFERENCE TO RELATED APPLICATIONS

This application is a national phase entry under 35 U.S.C. § 371 of International Application No. PCT/KR2019/000854, filed Jan. 21, 2019, which claims the priority to Korean Patent Application No. 10-2018-0007352, filed Jan. 19, 2018, the disclosures of which are incorporated herein by reference.

TECHNICAL FIELD

The present invention, when using a specific positive electrode active material, relates to a positive electrode and a secondary battery including the same, in which a total content of the remaining components excluding the positive electrode active material in the positive electrode active material layer and a loading amount of the positive electrode active material layer satisfy an optimum relationship.

BACKGROUND ART

In recent years, with the development of technology and demand for mobile devices, demand for a battery as an energy source has been rapidly increased, and accordingly, various studies on a battery have been conducted to meet various demands. Particularly, a study for a lithium secondary battery having a high energy density and excellent life-time and cycle characteristics as a power source of such devices has been actively conducted.

The lithium secondary battery means a battery in which an electrode assembly, which includes: a positive electrode containing a positive electrode active material capable of intercalating/deintercalating lithium ions; a negative electrode containing a negative electrode active material capable of intercalating/deintercalating lithium ions; a micro-porous separator interposed between the positive electrode and the negative electrode; and a non-aqueous electrolyte containing lithium ions, is included.

The positive electrode and/or the negative electrode may include a conductive material to improve conductivity. Conventionally, a dot-type conductive material such as carbon black has been mainly used, but when a content of the conductive material is increased to improve the conductivity, an amount of the positive electrode active material or the negative electrode active material is relatively decreased, and accordingly, output and durability of the battery are deteriorated, thereby deteriorating the life-time characteristics. Particularly, in a case of the positive electrode, the positive electrode active material itself has a level of low conductivity, and thus the above-described problems are exhibited much seriously.

To solve the problems, a method for using a linear conductive material such as a carbon nanotube has been introduced. Since the carbon nanotube has a relatively longer length than the particle-type conductive material, the conductivity may be improved even with a smaller content than the dot-type conductive material. Accordingly, the amount of the active material may be increased.

Meanwhile, the positive electrode of the secondary battery requires a high energy density, and the positive electrode may include a positive electrode active material capable of manufacturing a battery having high capacity such as $Li(Ni_{0.6}Mn_{0.2}Co_{0.2})O_2$ and $Li(Ni_{0.8}Mn_{0.1}Co_{0.1})O_2$.

However, when adhesion between the positive electrode active material layer and a current collector (positive electrode adhesion), and mobility of the lithium ions are not ensured in the positive electrode including the carbon nanotube and a binder in addition to the positive electrode active materials, there are problems that the life-time characteristics at high temperature and output characteristics in an environment requiring high output are deteriorated.

Accordingly, there has been a demand for a positive electrode capable of improving life-time characteristics at high temperature and high output characteristics, and including the positive electrode active materials, the carbon nanotube, and the binder.

DISCLOSURE OF THE INVENTION

Technical Problem

An aspect of the present invention provides a positive electrode and a secondary battery including the same, the positive electrode including: a positive electrode active material which is any one among $Li(Ni_{x1}Mn_{y1}Co_{z1})O_2$ (0.55<x1<0.69, 0.15<y1<0.29, 0.15<z1<0.29, x1+y1+z1=1) and $Li(Ni_{x2}Mn_{y2}Co_{z2})O_2$ (0.75<x2<0.89, 0.05<y2<0.19, 0.05<z2<0.19, x2+y2+z2=1); a carbon nanotube; and a binder, and having high output characteristics and excellent life-time characteristics at a high temperature.

Technical Solution

According to an aspect of the present invention, there is provided a positive electrode including a current collector and a positive electrode active material layer disposed on the current collector, wherein the positive electrode active material layer includes a positive electrode active material, a conductive material, and a binder, wherein the positive electrode active material contains any one among $Li(Ni_{x1}Mn_{y1}Co_{z1})O_2$ (0.55<x1<0.69, 0.15<y1<0.29, 0.15<z1<0.29, x1+y1+z1=1) and $Li(Ni_{x2}Mn_{y2}Co_{z2})O_2$ (0.75<x2<0.89, 0.05<y2<0.19, 0.05<z2<0.19, x2+y2+z2=1), and the conductive material contains a carbon nanotube, and when the positive electrode active material is $Li(Ni_{x1}Mn_{y1}Co_{z1})O_2$, the positive electrode active material layer satisfies Relation 1 and when the positive electrode active material is $Li(Ni_{x2}Mn_{y2}Co_{z2})O_2$, the positive electrode active material layer satisfies Relation 2:

$$0.0020 \times a < b < 0.0050 \times a \quad \text{[Relation 1]}$$

$$0.0015 \times a < b < 0.0044 \times a \quad \text{[Relation 2]}$$

In Relation 1 and Relation 2, "a" means a loading amount (unit: mg/25 cm$^2$) of the positive electrode active material layer, and "b" means a total content (unit: wt %) of the remaining components excluding the positive electrode active material in the positive electrode active material layer with respect to the total weight of the positive electrode active material layer.

According to another aspect of the present invention, there are provided a secondary battery and a battery module including the positive electrode.

Advantageous Effects

According to the present invention, in a positive electrode including a positive electrode active material which is any one among $Li(Ni_{x1}Mn_{y1}Co_{z1})O_2$ (0.55<x1<0.69, 0.15<y1<0.29, 0.15<z1<0.29, x1+y1+z1=1) and Li(Ni$_{x2}$Mn$_{y2}$ Co$_{z2}$)O$_2$ (0.75<x2<0.89, 0.05<y2<0.19, 0.05<z2<0.19, x2+y2+z2=1), since an appropriate relation between a loading amount of a positive electrode active material layer and a total content of the remaining components excluding the positive electrode active material in the positive electrode active material layer is satisfied, positive electrode adhesion and mobility of lithium ions may be appropriately controlled, thereby improving high output characteristics and life-time characteristics at high temperature of a secondary battery.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
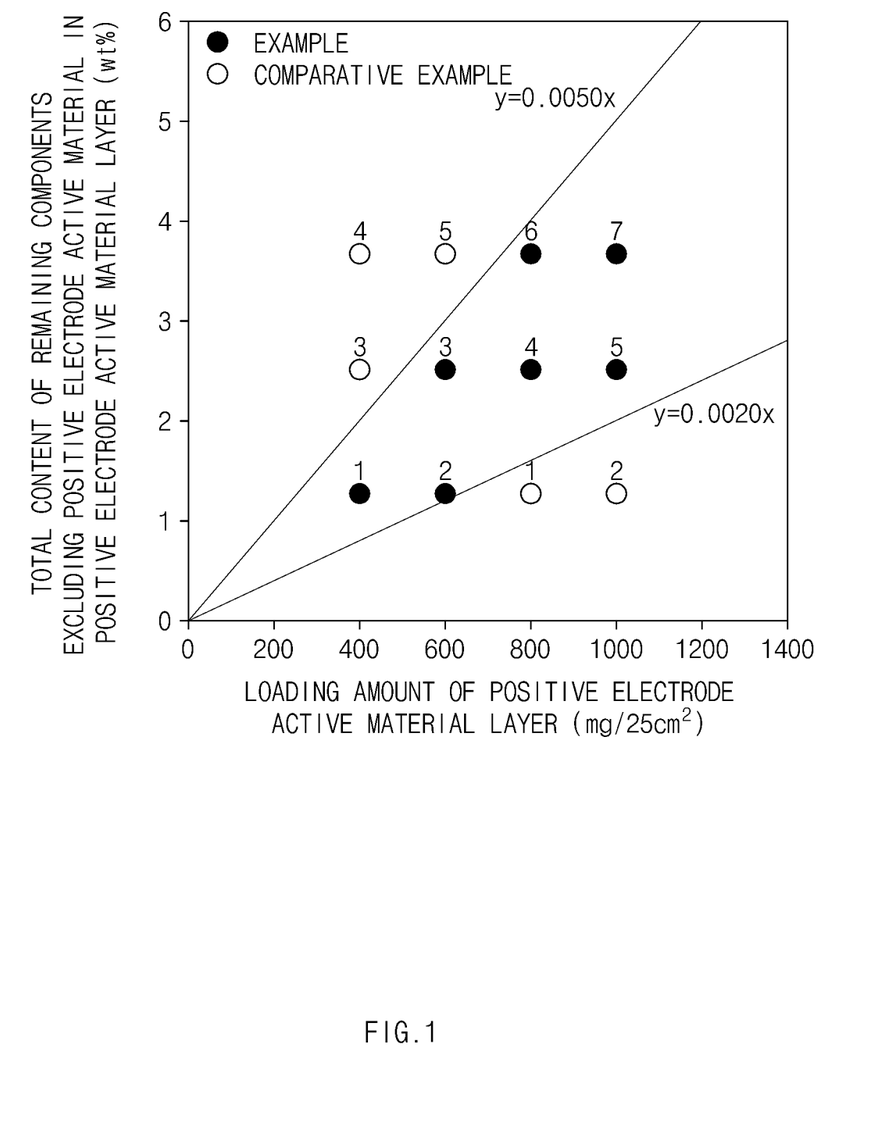
FIG. 1 is a graph showing a total content of the remaining components excluding the positive electrode active material in a positive electrode active material layer in Examples and Comparative Examples.
Figure 2:
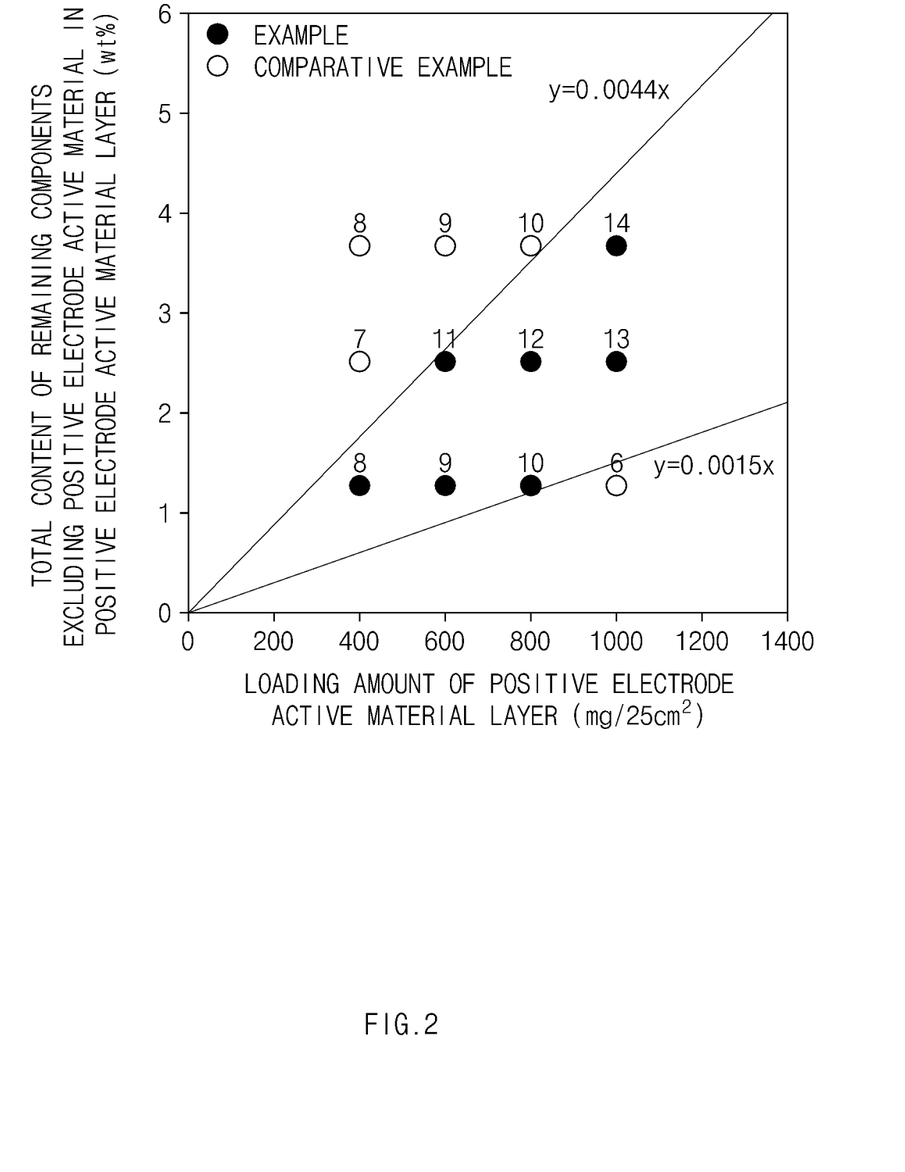
FIG. 2 is a graph showing a loading amount of a positive electrode active material layer and a total content of the remaining components excluding the positive electrode active material in a positive electrode active material layer in Examples and Comparative Examples.

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

According to an aspect of the present invention, a positive electrode includes a current collector and a positive electrode active material layer disposed on the current collector, wherein the positive electrode active material layer includes a positive electrode active material, a conductive material, and a binder, wherein the positive electrode active material contains any one among Li(Ni$_{x1}$Mn$_{y1}$Co$_{z1}$)O$_2$ (0.55<x1<0.69, 0.15<y1<0.29, 0.15<z1<0.29, x1+y1+z1=1) and Li(Ni$_{x2}$Mn$_{y2}$ Co$_{z2}$)O$_2$ (0.75<x2<0.89, 0.05<y2<0.19, 0.05<z2<0.19, x2+y2+z2=1) and the conductive material contains a carbon nanotube, and when the positive electrode active material is Li(Ni$_{x1}$Mn$_{y1}$Co$_{z1}$)O$_2$, the positive electrode active material layer satisfies Relation 1 and when the positive electrode active material is Li(Ni$_{x2}$ Mn$_{y2}$ Co$_{z2}$)O$_2$, the positive electrode active material layer satisfies Relation 2:

$$0.0020 \times a < b < 0.0050 \times a \quad \text{[Relation 1]}$$

$$0.0015 \times a < b < 0.0044 \times a \quad \text{[Relation 2]}$$

In Relation 1 and Relation 2, "a" means a loading amount (unit: mg/25 cm$^2$) of the positive electrode active material layer, and "b" means a total content (unit: wt %) of the remaining components excluding the positive electrode active material in the positive electrode active material layer with respect to the total weight of the positive electrode active material layer.

The current collector is not particularly limited as long as having electrical conductivity without causing any chemical changes in the battery. For example, the current collector may use copper, stainless steel, aluminum, nickel, titanium, sintered carbon, or aluminum or stainless steel of which surface is treated with carbon, nickel, titanium, silver, or the like. Specifically, a transition metal which adsorbs carbon well such as copper and nickel may be used as a current collector.

The positive electrode active material layer may be disposed on the current collector. The positive electrode active material layer may be disposed on one side or both sides of the current collector.

The loading amount of the positive electrode active material layer may be 20-1500 mg/25 cm$^2$, specifically 100-1300 mg/25 cm$^2$, and more specifically 300-1100 mg/25 cm$^2$.

The positive electrode active material layer may include a positive electrode active material, a conductive material, and a binder.

The positive electrode active material may contain any one among Li(Ni$_{x1}$Mn$_{y1}$Co$_{z1}$)O$_2$ (0.55<x1<0.69, 0.15<y1<0.29, 0.15<z1<0.29, x1+y1+z1=1) and Li(Ni$_{x2}$Mn$_{y2}$ Co$_{z2}$)O$_2$ (0.75<x2<0.89, 0.05<y2<0.19, 0.05<z2<0.19, x2+y2+z2=1). Specifically, the positive electrode active material may be composed of any one among Li(Ni$_{x1}$Mn$_{y1}$Co$_{z1}$)O$_2$ (0.55<x1<0.69, 0.15<y1<0.29, 0.15<z1<0.29, x1+y1+z1=1) and Li(Ni$_{x2}$Mn$_{y2}$ Co$_{z2}$)O$_2$ (0.75<x2<0.89, 0.05<y2<0.19, 0.05<z2<0.19, x2+y2+z2=1). More specifically, the positive electrode active material may be composed of any one among Li(Ni$_{x1}$Mn$_{y1}$Co$_{z1}$)O$_2$ (0.56<x1<0.66, 0.17<y1<0.22, 0.17<z1<0.22, x1+y1+z1=1) and Li(Ni$_{x2}$Mn$_{y2}$ Co$_{z2}$)O$_2$ (0.76<x2<0.88, 0.06<y2<0.12, 0.06<z2<0.12, x2+y2+z2=1). Li(Ni$_{x1}$Mn$_{y1}$Co$_{z1}$)O$_2$ and Li(Ni$_{x2}$ Mn$_{y2}$ Co$_{z2}$)O$_2$ have high energy densities, thereby enabling producing a high capacity battery.

An average particle diameter (D$_{50}$) of the positive electrode active material may be 3-20 μm, specifically 6-18 μm, and more specifically 9-16 μm. When the above range is satisfied, life-time characteristics at high temperature and output characteristics of a battery may be improved. In the description, an average particle diameter (D$_{50}$) may mean a particle diameter corresponding to 50% of a volume accumulation amount in a particle diameter distribution curve of particles. The average particle size (D$_{50}$) may be measured using, for example, a laser diffraction method. The laser diffraction method generally enables to measure a particle diameter about from a submicron region to several millimeters (mm), thereby obtaining results having high reproducibility and high resolution.

The conductive material may contain a carbon nanotube, and specifically, may be composed of a carbon nanotube.

The carbon nanotube may be a single-walled carbon nanotube or a multi-walled carbon nanotube, but more preferably, may be a multi-walled carbon nanotube.

An average diameter of the carbon nanotube may be 1-30 nm, specifically 3-26 nm, and more specifically 5-22 nm. When the above range is satisfied, the carbon nanotube is easily dispersed in the positive electrode slurry, thereby improving conductivity of the positive electrode. The average diameter may be measured by using TEM or SEM.

A BET specific surface area of the carbon nanotube may be 100-300 m$^2$/g, specifically 125-275 m$^2$/g, and more specifically 150-250 m$^2$/g. When the above range is satisfied, the carbon nanotube is easily dispersed in the positive electrode slurry, thereby improving conductivity of the positive electrode. The BET specific surface area may be measured by using a nitrogen adsorption BET method.

When the positive electrode active material is Li(Ni$_{x1}$Mn$_{y1}$Co$_{z1}$)O$_2$ (0.55<x1<0.69, 0.15<y1<0.29, 0.15<z1<0.29, x1+y1+z1=1), the carbon nanotube may be contained in an amount of 0.25-1.15 wt %, and specifically 0.30-1.10 wt % with respect to the total weight of the positive electrode active material layer. When the positive electrode active material is Li(Ni$_{x2}$Mn$_{y2}$Co$_{z2}$)O$_2$ (0.75<x2<0.89, 0.05<y2<0.19, 0.05<z2<0.19, x2+y2+z2=1), the carbon nanotube may be contained in an amount of 0.20-1.10 wt %, and specifically 0.25-1.05 wt % with respect to the total weight of the positive electrode active material layer. When the above range is satisfied, the conductivity of the electrode may be ensured, thereby improving output and life-time characteristics of a battery while the content of the positive electrode active material may be sufficiently ensured, thereby preventing deterioration in initial capacity of a battery.

The binder may contain a fluorine-based binder and a non-fluorine-based binder, and specifically, the binder may be composed of a fluorine-based binder and a non-fluorine-based binder.

The fluorine-based binder may be polyvinylidene fluoride (PVdF) to improve chemical stability and positive electrode adhesion. A weight average molecular weight of the fluorine-based binder may be 200,000-1,200,000 g/mol, and specifically 500,000-1,000,000 g/mol. When the above range is satisfied, the adhesion (positive electrode adhesion) between the positive electrode active material layer and the current collector may be improved.

The non-fluorine-based binder may be at least one among nitrile butadiene rubber (NBR) and hydrogenated nitrile butadiene rubber (H-NBR), and specifically may be hydrogenated nitrile butadiene rubber.

A weight ratio of the fluorine-based binder and the non-fluorine-based binder may be 35:1 to 1:1, and specifically 29:1 to 2:1. When the above range is satisfied, there are effects of improving the positive electrode adhesion and improving dispersion of the carbon nanotube.

The binder may be contained in an amount of 0.80-3.00 wt %, specifically 0.85-2.90 wt %, more specifically 0.90-2.80 wt % with respect to the total weight of the positive electrode active material layer. When the above range is satisfied, the sufficient positive adhesion may be ensured, and simultaneously, when the above range is satisfied, voids in the electrode are sufficient and an electrolyte solution is easily dispersed, whereby electrode resistance may be reduced and flexibility of the electrode may be prevented from being excessively deteriorated.

In the positive electrode active material of an embodiment, when the positive electrode active material is Li(Ni$_{x1}$Mn$_{y1}$Co$_{z1}$)O$_2$ (0.55<x1<0.69, 0.15<y1<0.29, 0.15<z1<0.29, x1+y1+z1=1), the positive electrode active material layer satisfies Relation 1 and when the positive electrode active material is Li(Ni$_{x2}$Mn$_{y2}$Co$_{z2}$)O$_2$ (0.75<x2<0.89, 0.05<y2<0.19, 0.05<z2<0.19, x2+y2+z2=1), the positive electrode active material layer satisfies Relation 2:

$$0.0020 \times a < b < 0.0050 \times a \quad \text{[Relation 1]}$$

$$0.0015 \times a < b < 0.0044 \times a \quad \text{[Relation 2]}$$

In Relation 1 and Relation 2, "a" means a loading amount (unit: mg/25 cm$^2$) of the positive electrode active material layer, and "b" means a total content (unit: wt %) of the remaining components excluding the positive electrode active material in the positive electrode active material layer with respect to the total weight of the positive electrode active material layer.

Specifically, when the positive electrode active material is Li(Ni$_{x1}$Mn$_{y1}$Co$_{z1}$)O$_2$ (0.55<x1<0.69, 0.15<y1<0.29, 0.15<z1<0.29, x1+y1+z1=1), the positive electrode active material layer satisfies Relation 3 and when the positive electrode active material is Li(Ni$_{x2}$Mn$_{y2}$Co$_{z2}$)O$_2$ (0.75<x2<0.89, 0.05<y2<0.19, 0.05<z2<0.19, x2+y2+z2=1), the positive electrode active material layer satisfies Relation 4:

$$0.0021 \times a < b < 0.0047 \times a \quad \text{[Relation 3]}$$

$$0.0017 \times a < b < 0.0043 \times a \quad \text{[Relation 4]}$$

When the positive electrode active material is Li(Ni$_{x1}$Mn$_{y1}$Co$_{z1}$)O$_2$, the positive electrode active material layer satisfies a relation of b≤0.0020×a or when the positive electrode active material is Li(Ni$_{x2}$Mn$_{y2}$Co$_{z2}$)O$_2$, the positive electrode active material layer satisfies a relation of b≤0.0015×a, the total content of the remaining components excluding the positive electrode active material in the positive electrode active material layer is insufficient, whereby the positive electrode adhesion is deteriorated and the positive electrode active material layer tends to peel off from the current collector, so that there is a problem of drastically deteriorating the life-time characteristics of the secondary battery at a high temperature of 45° C. or more.

Meanwhile, when the positive electrode active material is Li(Ni$_{x1}$Mn$_{y1}$Co$_{z1}$)O$_2$, the positive electrode active material layer satisfies a relation of b≥0.0050×a or when the positive electrode active material is Li(Ni$_{x2}$Mn$_{y2}$Co$_{z2}$)O$_2$, the positive electrode active material layer satisfies a relation of b≤0.0044×a, the total content of the remaining components excluding the positive electrode active material in the positive electrode active material layer is excessively large, whereby voids in the positive electrode active material layer are hardly present. As a result, lithium ions are difficult to transfer in the positive electrode active material layer, so that there is a problem of deteriorating the output characteristics.

In the present invention, particularly, the relationship between the total content of the remaining components excluding the positive electrode active material and the loading amount in the positive electrode active material layer is important. That is, not only the total content of the remaining components excluding the positive electrode active material in the positive electrode active material layer is a major factor, but in the present invention, also the loading amount is considered together, and thus both the positive electrode adhesion and the lithium ion mobility are improved, thereby improving the life-time and output characteristics of a battery.

According to another aspect of the present invention, a secondary battery includes: a positive electrode; a negative electrode; a separator interposed between the positive electrode and the negative electrode; and an electrolyte, wherein the positive electrode is the same as the positive electrode of the described embodiment. Accordingly, description of the positive electrode will be omitted.

The negative electrode may include a negative electrode current collector and a negative electrode active material layer disposed on one side or both sides of the negative electrode current collector.

The negative electrode current collector is not particularly limited as long as having electrical conductivity without causing any chemical changes in the battery. For example, the negative electrode current collector may use copper, stainless steel, aluminum, nickel, titanium, sintered carbon, or aluminum or stainless steel of which surface is treated with carbon, nickel, titanium, silver, or the like. Specifically, a transition metal which adsorbs carbon well such as copper and nickel may be used as a negative electrode current collector.

The negative electrode active material layer may include a negative electrode active material, a negative electrode conductive material, and a negative electrode binder.

The negative electrode active material may be a graphite-based active material particle or a silicon-based active material particle. The graphite-based active material particle may use at least one selected from the group consisting of artificial graphite, natural graphite, a graphitized carbon fiber, and a graphitized mesocarbon microbead, and particularly, when artificial graphite is used, rate characteristics may be improved. The silicon-based active material particle may use at least one selected from the group consisting of Si, $SiO_x$ (0<x<2), a Si—C composite, and a Si—Y alloy (wherein, Y is an element selected from the group consisting of an alkali metal, an alkaline earth metal, a transition metal, a Group 13 element, a Group 14 element, a rare earth element, and a combination thereof), and particularly, when Si is used, a high capacity battery may be obtained.

The negative electrode binder may include at least one selected from the group consisting of a polyvinylidene fluoride-hexafluoropropylene copolymer (PVDF-co-HFP), polyvinylidene fluoride, polyacrylonitrile, polymethylmethacrylate, polyvinyl alcohol, carboxymethylcellulose (CMC), starch, hydroxypropylcellulose, regenerated cellulose, polyvinylpyrrolidone, tetrafluoroethylene, polyethylene, polypropylene, polyacrylic acid, an ethylene-propylene-diene monomer (EPDM), a sulfonated-EPDM, a styrene butadiene rubber (SBR), a fluorine rubber, polyacrylic acid, and a material in which hydrogen is substituted with Li, Na, or Ca, etc., and may also include various copolymers thereof.

The negative electrode conductive material is not particularly limited as long as having electrical conductivity without causing any chemical changes in the battery, and the negative electrode conductive material may use, for example: graphite such as natural graphite and artificial graphite; carbon black such as carbon black, acetylene black, Ketjen black, channel black, furnace black, lamp black, and thermal black; a conductive fiber such as a carbon fiber and a metal fiber; a conductive tube such as a carbon nanotube; a metal powder such as fluorocarbon powder, aluminum powder, and nickel powder; a conductive whisker such as zinc oxide and potassium titanate; a conductive metal oxides such as titanium oxide; or conductive materials such as polyphenylene derivatives, etc.

The separator serves to separate the negative electrode and the positive electrode from each other and provide a transfer channel for lithium ions, and any separator may be used without particular limitation as long as typically used in a secondary battery, and particularly, a separator having excellent electrolyte-retention ability as well as low resistance to transfer of the electrolyte ions may be preferably used for the separator. Specifically, a porous polymer film, for example, a porous polymer film formed of a polyolefin-based polymer (e.g., an ethylene homopolymer, a propylene homopolymer, an ethylene/butene copolymer, an ethylene/hexene copolymer, and an ethylene/methacrylate copolymer), or a laminated structure having two or more layers thereof may be used. In addition, a typical porous nonwoven fabric, for example, a nonwoven fabric formed of a glass fiber having a high melting point or a polyethylene terephthalate fiber may be used.

Alternatively, a coated separator containing a ceramic component or a polymer material may be used to ensure heat resistance or mechanical strength, and either a single layer structure or a multilayer structure may be selectively used.

Examples of the electrolyte may include an organic-based liquid electrolyte, an inorganic-based liquid electrolyte, a solid polymer electrolyte, a gel-type polymer electrolyte, a solid inorganic electrolyte, and a molten-type inorganic electrolyte which are available in production of a lithium secondary battery, but the embodiment is not limited thereto.

Specifically, the electrolyte may include a non-aqueous organic solvent and a metal salt.

As the non-aqueous organic solvent, for example, an aprotic organic solvent such as N-methyl-2-pyrrolidinone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate, etc. may be used.

Particularly, ethylene carbonate and propylene carbonate, which are cyclic carbonates among the carbonate-based organic solvent, may be preferably used because the carbonate-based organic solvents have a high viscosity and a high dielectric constant to easily dissociate a lithium salt, and when dimethyl carbonate and diethyl carbonate, which are linear carbonates having a low viscosity and a low dielectric constant, are added to the cyclic carbonates and mixed in an appropriate ratio, an electrolyte having a high electric conductivity may be prepared, and the electrolyte prepared in this way may be more preferably used.

The metal salt may use a lithium salt, and the lithium salt may be easily soluble in the non-aqueous electrolyte, and an anion of the lithium salt may use one selected from the group consisting of, for example, $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

In addition to the electrolyte components, to improve life-time characteristics of a battery, suppress capacity reduction of a battery, and improve discharge capacity of a battery, the electrolyte may further contain one more additive of, for example, a halo-alkylene carbonate-based compound such as difluoroethylene carbonate, pyridine, triethylphosphite, triethanolamine, cyclic ether, ethylene diamine, n-glyme, hexaphosphoric triamide, nitrobenzene derivatives, sulfur, quinone imine dyes, N-substituted oxazolidinone, N,N-substituted imidazolidine, ethylene glycol dialkyl ether, an ammonium salt, pyrrole, 2-methoxy ethanol, aluminum trichloride, or the like.

According to another aspect of the present invention, there are provided: a battery module including the secondary battery as a unit cell; and a battery pack including the same. Since the battery module and the battery pack include the secondary battery having a high capacity, enhanced rate performance, and high cycle characteristics, the battery module and the battery pack may be used as a power source of a middle-sized or large-sized device selected from a group consisting of electric vehicles, hybrid electric vehicles, plug-in hybrid electric vehicles, and a power storage system.

Hereinafter, the present invention will be described in more detail according to examples. However, the invention may be embodied in many different forms and should not be construed as being limited to the embodiments set forth herein.

Example 1: Manufacture of Secondary Battery (1) Production of Positive Electrode $Li(Ni_{0.6}Mn_{0.2}Co_{0.2})O_2$ having an average particle diameter ($D_{50}$) of 12 μm was used as a positive electrode active material, and a multi-walled carbon nanotube having an average diameter of 12 nm and a BET specific surface area of 200 $m^2/g$ was used as a conductive material.

A conductive material dispersed solution including the multi-walled carbon nanotube, hydrogenated nitrile butadiene rubber (H-NBR), and N-methylpyrrolidone (NMP) which is a dispersion medium was prepared. Thereafter, the positive electrode active material, PVdF having a weight average molecular weight of 900,000 g/mol, the conductive material dispersed solution, and NMP were mixed to prepare a positive electrode slurry having a solid content of 70% and a weight ratio of the positive electrode active material, the carbon nanotube, and the binders (PVdF and H-NBR) of 98.75:0.35:0.90.

The positive electrode slurry was applied to a positive electrode current collector (Al) having a thickness of 20 μm and dried in a vacuum oven at 130° C. for 6 hours. Thereafter, the current collector was rolled between rolls heated to 60° C. under a pressure of 10 MPa to produce a positive electrode having a final thickness (a thickness of the current collector and the active material layer) of 78 μm and a loading amount of the positive electrode active material layer of 400 mg/25 $cm^2$. The total content of the remaining components (the conductive material and the binder) excluding the positive electrode active material in the positive electrode active material layer was 1.25 wt % with respect to the total weight of the positive electrode active material layer.

(2) Manufacture of Secondary Battery

Natural graphite as a negative electrode active material, carbon black as a negative electrode conductive material, and styrene butadiene rubber (SBR) as a negative electrode binder were mixed with distilled water at a weight ratio of 92:2:6, respectively, to prepare a negative electrode slurry. The prepared slurry was applied to a negative electrode current collector (Cu) having a thickness of 20 μm and dried in a vacuum oven at 80° C. for 6 hours. Thereafter, the current collector was rolled between rolls heated to 60° C. under a pressure of 10 MPa to produce a negative electrode having a final thickness (thicknesses of the current collector and the active material layer) of 65 μm and a loading amount of the active material layer of 250 mg/25 $cm^2$.

The produced negative electrode and positive electrode, and a porous polyethylene separator were assembled by using a stacking method, and an electrolyte solution (ethylenecarbonate (EC)/ethylmethylcarbonate (EMC)=1/2 (volume ratio), lithium hexafluorophosphate (1 mole of $LiPF_6$)) was injected into the assembled battery to manufacture a lithium secondary battery.

Examples 2 to 7 and Comparative Examples 1 to 5: Manufacture of Secondary Batteries Secondary batteries in Examples 2 to 7 and Comparative Examples 1 to 5 were manufactured in the same manner as in Example 1 except that, in Example 1, the content of the positive electrode active material, the total content of the remaining components excluding the positive electrode active material in the positive electrode active material layer, and the loading amount of the positive electrode active material layer were changed as shown in Table 1 below.

TABLE 1

| | Total content of positive electrode active material (wt %) | Total content of remaining components excluding positive electrode active material in positive electrode active material layer (wt %) | Loading amount of positive electrode active material layer (mg/25 $cm^2$) | Loading amount of positive electrode active material layer × 0.0020 (mg/25 $cm^2$) | Loading amount of positive electrode active material layer × 0.0050 (mg/25 $cm^2$) |
|---|---|---|---|---|---|
| Example 1 | 98.75 | 1.25 | 400 | 0.80 | 2.00 |
| Example 2 | 98.75 | 1.25 | 600 | 1.20 | 3.00 |
| Example 3 | 97.50 | 2.50 | 600 | 1.20 | 3.00 |
| Example 4 | 97.50 | 2.50 | 800 | 1.60 | 4.00 |
| Example 5 | 97.50 | 2.50 | 1000 | 2.00 | 5.00 |
| Example 6 | 96.25 | 3.75 | 800 | 1.60 | 4.00 |
| Example 7 | 96.25 | 3.75 | 1000 | 2.00 | 5.00 |
| Comparative Example 1 | 98.75 | 1.25 | 800 | 1.60 | 4.00 |
| Comparative Example 2 | 98.75 | 1.25 | 1000 | 2.00 | 5.00 |
| Comparative Example 3 | 97.50 | 2.50 | 400 | 0.80 | 2.00 |
| Comparative Example 4 | 96.25 | 3.75 | 400 | 0.80 | 2.00 |

TABLE 1-continued

| | Total content of positive electrode active material (wt %) | Total content of remaining components excluding positive electrode active material in positive electrode active material layer (wt %) | Loading amount of positive electrode active material layer (mg/25 cm²) | Loading amount of positive electrode active material layer × 0.0020 (mg/25 cm²) | Loading amount of positive electrode active material layer × 0.0050 (mg/25 cm²) |
|---|---|---|---|---|---|
| Comparative Example 5 | 96.25 | 3.75 | 600 | 1.20 | 3.00 |

The content (wt %) of the positive electrode active material, and the total content (wt %) of the conductive material and the binder are based on the total weight of the positive electrode active material layer.

Experimental Example 1: Evaluation of Life-Time at High Temperature

Charging/discharging were performed for the batteries in Examples 1 to 7 and Comparative Examples 1 to 5 and capacity retention rates at 500 cycles were evaluated, and the results are shown in Table 2 below.

At 45° C., a first cycle and a second cycle were charged/discharged at 0.5 C, and from 3 cycles to 500 cycles, charging/discharging were performed at 0.5 C/1.0 C. Charging conditions: CC (constant current)/CV (constant voltage) (4.25 V/0.05 C cut-off)

Discharging conditions: CC (constant current) condition 2.5 V cut-off

Specifically, the capacity retention rate was derived by the following calculation.

Capacity retention rate (%)=(500 times discharge capacity/1 time discharge capacity)×100

Experimental Example 2: Evaluation of High Output

Discharging rate characteristics were evaluated for the batteries in Examples 1 to 7 and Comparative Examples 1 to 5, and the results are shown in Table 2 below.

Specifically, for each of the batteries in Examples 1 to 7 and Comparative Examples 1 to 5, a reducing discharge capacity (%) was measured at a fixed charging rate of 0.5 C and a discharging rate of 4.0 C. Meanwhile, a discharge capacity at a discharging rate of 0.5 C was set as 100%.

TABLE 2

| | Satisfaction of Relation 1 (○/X) | Capacity retention rate at 500 cycles (%) | Discharge capacity at discharging rate of 4.0 C (%) |
|---|---|---|---|
| Example 1 | ○ | 86.5 | 77.5 |
| Example 2 | ○ | 81.3 | 76.2 |
| Example 3 | ○ | 88.4 | 75.3 |
| Example 4 | ○ | 85.8 | 74.1 |
| Example 5 | ○ | 82.6 | 71.5 |
| Example 6 | ○ | 85.3 | 72.8 |
| Example 7 | ○ | 80.3 | 70.3 |
| Comparative Example 1 | X | 71.5 | 63.8 |
| Comparative Example 2 | X | 55.4 | 58.9 |
| Comparative Example 3 | X | 92.3 | 63.8 |
| Comparative Example 4 | X | 94.1 | 59.2 |
| Comparative Example 5 | X | 89.4 | 66.2 |

Relation 1: $0.0020 \times a < b < 0.0050 \times a$, wherein means a loading amount (unit: mg/25 cm²) of the positive electrode active material layer, and "b" means a total content (unit: wt %) of the remaining components excluding the positive electrode active material in the positive electrode active material layer with respect to the total weight of the positive electrode active material layer.

Referring to Table 2, it could be confirmed that the batteries satisfying Relation 1 in Examples 1 to 7 had a higher discharge capacity at discharging rate of 4.0 C than the batteries not satisfying Relation 1 in Comparative Examples 1 to 5, and accordingly, it is considered that the batteries in Examples 1 to 7 have high output. It could also be confirmed that the batteries in Comparative Examples 1 and 2 had a lower capacity retention rate than the batteries in Examples. That is, it is considered that cycle characteristics and output characteristics may be improved together only when Relation 1 is satisfied.

Example 8: Manufacture of Secondary Battery (1) Production of Positive Electrode $Li(Ni_{0.8}Mn_{0.1}Co_{0.1})O_2$ having an average particle diameter ($D_{50}$) of 12 μm was used as a positive electrode active material, and a multi-walled carbon nanotube having an average diameter of 12 nm and a BET specific surface area of 200 m²/g was used as a conductive material.

A conductive material dispersed solution including the multi-walled carbon nanotube, hydrogenated nitrile butadiene rubber (H-NBR), and N-methylpyrrolidone (NMP)

which is a dispersion medium was prepared. Thereafter, the positive electrode active material, PVdF having a weight average molecular weight of 900,000 g/mol, the conductive material dispersed solution, and NMP were mixed to prepare a positive electrode slurry having a solid content of 70% and a weight ratio of the positive electrode active material, the carbon nanotube, and the binders (PVdF and H-NBR) of 98.75:0.35:0.90.

The positive electrode slurry was applied to a positive electrode current collector (Al) having a thickness of 20 μm and dried in a vacuum oven at 130° C. for 6 hours. Thereafter, the current collector was rolled between rolls heated to 60° C. under a pressure of 10 MPa to produce a positive electrode having a final thickness (a thickness of the current collector and the active material layer) of 78 μm and a loading amount of the positive electrode active material layer of 400 mg/25 cm². The total content of the remaining components (the conductive material and the binder) excluding the positive electrode active material in the positive electrode active material layer was 1.25 wt % with respect to the total weight of the positive electrode active material layer.

and the active material layer) of 65 μm and a loading amount of the active material layer of 250 mg/25 cm².

The produced negative electrode and positive electrode, and a porous polyethylene separator were assembled by using a stacking method, and an electrolyte solution (ethylenecarbonate (EC)/ethylmethylcarbonate (EMC)=1/2 (volume ratio), lithium hexafluorophosphate (1 mole of $LiPF_6$)) was injected into the assembled battery to manufacture a lithium secondary battery.

Examples 9 to 14 and Comparative Examples 6 to 10: Manufacture of Secondary Batteries Secondary batteries in Examples 9 to 14 and Comparative Examples 6 to 10 were manufactured in the same manner as in Example 8 except that, in Example 8, the content of the positive electrode active material, the total content of the remaining components excluding the positive electrode active material in the positive electrode active material layer, and the loading amount of the positive electrode active material layer were changed as shown in Table 3 below.

TABLE 3

|  | Total content of positive electrode active material (wt %) | Total content of remaining components excluding positive electrode active material in positive electrode active material layer (wt %) | Loading amount of positive electrode active material layer (mg/25 cm²) | Loading amount of positive electrode active material layer × 0.0015 (mg/25 cm²) | Loading amount of positive electrode active material layer × 0.0044 (mg/25 cm²) |
|---|---|---|---|---|---|
| Example 8 | 98.75 | 1.25 | 400 | 0.60 | 1.76 |
| Example 9 | 98.75 | 1.25 | 600 | 0.90 | 2.64 |
| Example 10 | 98.75 | 1.25 | 800 | 1.20 | 3.52 |
| Example 11 | 97.50 | 2.50 | 600 | 0.90 | 2.64 |
| Example 12 | 97.50 | 2.50 | 800 | 1.20 | 3.52 |
| Example 13 | 97.50 | 2.50 | 1000 | 1.50 | 4.40 |
| Example 14 | 96.25 | 3.75 | 1000 | 1.50 | 4.40 |
| Comparative Example 6 | 98.75 | 1.25 | 1000 | 1.50 | 4.40 |
| Comparative Example 7 | 97.50 | 2.50 | 400 | 0.60 | 1.76 |
| Comparative Example 8 | 96.25 | 3.75 | 400 | 0.60 | 1.76 |
| Comparative Example 9 | 96.25 | 3.75 | 600 | 0.90 | 2.64 |
| Comparative Example 10 | 96.25 | 3.75 | 800 | 1.20 | 3.52 |

(2) Manufacture of Secondary Battery

Natural graphite as a negative electrode active material, carbon black as a negative electrode conductive material, and styrene butadiene rubber (SBR) as a negative electrode binder were mixed with distilled water at a weight ratio of 92:2:6, respectively, to prepare a negative electrode slurry. The prepared slurry was applied to a negative electrode current collector (Cu) having a thickness of 20 μm and dried in a vacuum oven at 80° C. for 6 hours. Thereafter, the current collector was rolled between rolls heated to 60° C. under a pressure of 10 MPa to produce a negative electrode having a final thickness (a thickness of the current collector The content (wt %) of the positive electrode active material, and the total content (wt %) of the conductive material and the binder are based on the total weight of the positive electrode active material layer.

Experimental Example 3: Evaluation of Life-Time at High Temperature

Charging/discharging were performed for the batteries in Examples 8 to 14 and Comparative Examples 6 to 10 and capacity retention rates at 500 cycles were evaluated, and the results are shown in Table 4 below.

At 45° C., a first cycle and a second cycle were charged/discharged at 0.5 C, and from 3 cycles to 500 cycles, charging/discharging were performed at 0.5 C/1.0 C.

Charging conditions: CC (constant current)/CV (constant voltage) (4.25 V/0.05 C cut-off)

Discharging conditions: CC (constant current) condition 2.5 V cut-off

Specifically, the capacity retention rate was derived by the following calculation.

Capacity retention rate (%)=(500 times discharge capacity/1 time discharge capacity)×100

Experimental Example 4: Evaluation of High Output

Discharging rate characteristics were evaluated for the batteries in Examples 8 to 14 and Comparative Examples 6 to 10, and the results are shown in Table 4 below.

Specifically, for each of the batteries in Examples 8 to 14 and Comparative Examples 6 to 10, a reducing discharge capacity (%) was measured at a fixed charging rate of 0.5 C and a discharging rate of 4.0 C. Meanwhile, a discharge capacity at a discharging rate of 0.5 C was set as 100%.

TABLE 4

|  | Satisfaction of Relation 2 (○/X) | Capacity retention rate at 500 cycles (%) | Discharge capacity at discharging rate of 4.0 C (%) |
| --- | --- | --- | --- |
| Example 8 | ○ | 88.4 | 81.2 |
| Example 9 | ○ | 84.5 | 78.6 |
| Example 10 | ○ | 81.6 | 76.2 |
| Example 11 | ○ | 90.3 | 77.0 |
| Example 12 | ○ | 86.8 | 75.3 |
| Example 13 | ○ | 82.3 | 72.8 |
| Example 14 | ○ | 80.9 | 71.2 |
| Comparative Example 6 | X | 76.5 | 65.8 |
| Comparative Example 7 | X | 92.3 | 62.3 |
| Comparative Example 8 | X | 93.1 | 60.2 |
| Comparative Example 9 | X | 91.5 | 62.3 |
| Comparative Example 10 | X | 86.4 | 65.8 |

Relation 2: $0.0015 \times a < b < 0.0044 \times a$, wherein means a loading amount (unit: mg/25 cm$^2$) of the positive electrode active material layer, and "b" means a total content (unit: wt %) of the remaining components excluding the positive electrode active material in the positive electrode active material layer with respect to the total weight of the positive electrode active material layer.

Referring to Table 4, it could be confirmed that the batteries satisfying Relation 2 in Examples 8 to 14 had a higher discharge capacity at discharging rate of 4.0 C than the batteries not satisfying Relation 2 in Comparative Examples 6 to 10, and accordingly, it is considered that the batteries in Examples 8 to 14 have high output. It could also be confirmed that the battery in Comparative Example 6 had a lower capacity retention rate than the batteries in Examples. That is, it is considered that cycle characteristics and output characteristics may be improved together only when Relation 2 is satisfied.

The invention claimed is:

1. A positive electrode comprising:
a current collector; and
a positive electrode active material layer disposed on the current collector,
wherein the positive electrode active material layer includes a positive electrode active material, a conductive material, and a binder,
wherein the positive electrode active material includes any one of $Li(Ni_{x1}Mn_{y1}Co_{z1})O_2$, wherein $0.55 < x1 < 0.69$, $0.15 < y1 < 0.29$, $0.15 < z1 < 0.29$, $x1+y1+z1=1$ or $Li(Ni_{x2}Mn_{y2}Co_{z2})O_2$ wherein $0.75 < x2 < 0.89$, $0.05 < y2 < 0.19$, $0.05 < z2 < 0.19$, $x2+y2+z2=1$,
the conductive material includes a carbon nanotube,
when the positive electrode active material is $Li(Ni_{x1}Mn_{y1}Co_{z1})O_2$, the positive electrode active material layer satisfies Relation 1, and
when the positive electrode active material is $Li(Ni_{x2}Mn_{y2}Co_{z2})O_2$, the positive electrode active material layer satisfies Relation 2:

$$0.0020 \times a < b < 0.0050 \times a \quad \text{[Relation 1]}$$

$$0.0015 \times a < b < 0.0044 \times a \quad \text{[Relation 2]}$$

wherein,
a is a loading amount (unit: mg/25 cm$^2$) of the positive electrode active material layer, and
b is a total content (unit: wt %) of the remaining components excluding the positive electrode active material in the positive electrode active material layer with respect to a total weight of the positive electrode active material layer.

2. The positive electrode of claim 1,
wherein an average diameter of the carbon nanotube is 1-30 nm.

3. The positive electrode of claim 1,
wherein a BET specific surface area of the carbon nanotube is 100-300 m$^2$/g.

4. The positive electrode of claim 1,
wherein when the positive electrode active material is $Li(Ni_{x1}Mn_{y1}Co_{z1})O_2$, wherein $0.55 < x1 < 0.69$, $0.15 < y1 < 0.29$, $0.15 < z1 < 0.29$, $x1+y1+z1=1$, the carbon nanotube is contained in an amount of 0.25-1.15 wt %.

5. The positive electrode of claim 1,
wherein when the positive electrode active material is $Li(Ni_{x2}Mn_{y2}Co_{z2})O_2$, wherein $0.75 < x2 < 0.89$, $0.05 < y2 < 0.19$, $0.05 < z2 < 0.19$, $x2+y2+z2=1$, the carbon nanotube is contained in an amount of 0.20-1.10 wt %.

6. The positive electrode of claim 1,
wherein the binder comprises a fluorine-based binder and a non-fluorine-based binder.

7. The positive electrode of claim 6,
wherein a weight average molecular weight of the fluorine-based binder is 200,000-1,200,000 g/mol.

8. The positive electrode of claim 6,
wherein a weight ratio of the fluorine-based binder and the non-fluorine-based binder is 35:1 to 1:1.

9. The positive electrode of claim 1,
wherein the binder is contained in an amount of 0.8-3.0 wt %.

10. A secondary battery comprising:
a positive electrode according to claim 1,
a negative electrode;
a separator interposed between the positive electrode and the negative electrode; and
an electrolyte.

11. A battery module comprising the secondary battery of claim 10 as a unit cell.

\* \* \* \* \*